US008868416B2

(12) United States Patent
Lou et al.

(10) Patent No.: US 8,868,416 B2
(45) Date of Patent: Oct. 21, 2014

(54) APPARATUS AND METHOD FOR CANCELLING ECHO IN JOINT TIME DOMAIN AND FREQUENCY DOMAIN

(75) Inventors: Shasha Lou, Weifang (CN); Song Liu, Weifang (CN)

(73) Assignee: Goertek Inc., Weifang (CN)

(*) Notice: Subject to any disclaimer, the term of this patent is extended or adjusted under 35 U.S.C. 154(b) by 281 days.

(21) Appl. No.: 13/389,367

(22) PCT Filed: Dec. 22, 2010

(86) PCT No.: PCT/CN2010/080115
§ 371 (c)(1),
(2), (4) Date: Feb. 7, 2012

(87) PCT Pub. No.: WO2011/085628
PCT Pub. Date: Jul. 21, 2011

(65) Prior Publication Data
US 2012/0136654 A1    May 31, 2012

(30) Foreign Application Priority Data

Jan. 13, 2010    (CN) .......................... 2010 1 0000560

(51) Int. Cl.
*G10L 21/00* (2013.01)
*G10L 21/02* (2013.01)
*H04M 9/08* (2006.01)
*H04B 3/23* (2006.01)

(52) U.S. Cl.
CPC *H04M 9/082* (2013.01); *H04B 3/23* (2013.01)
USPC .............................. 704/228; 704/227; 704/226

(58) Field of Classification Search
None
See application file for complete search history.

(56) References Cited

U.S. PATENT DOCUMENTS

| | | | |
|---|---|---|---|
| 5,317,596 A | 5/1994 | Ho et al. | |
| 5,920,834 A * | 7/1999 | Sih et al. | 704/233 |
| 6,505,057 B1 * | 1/2003 | Finn et al. | 455/569.2 |
| 6,522,746 B1 * | 2/2003 | Marchok et al. | 379/406.03 |
| 6,891,948 B2 * | 5/2005 | Takada et al. | 379/406.01 |
| 8,411,871 B2 * | 4/2013 | Schwingshackl et al. | 381/66 |
| 8,498,423 B2 * | 7/2013 | Thaden et al. | 381/66 |
| 2002/0021799 A1 * | 2/2002 | Kaufholz | 379/406.03 |
| 2003/1008094 | 6/2003 | Lai et al. | |

OTHER PUBLICATIONS

International Search Report PCT/CN2010/080115, dated Mar. 31, 2011.

* cited by examiner

*Primary Examiner* — Jesse Pullias
(74) *Attorney, Agent, or Firm* — Troutman Sanders LLP

(57) ABSTRACT

Disclosed in the present invention is a method for cancelling echo in joint time domain and frequency domain. The method includes: receiving an input receiver signal and an input transmitter signal; implementing echo cancellation on the received transmitter signal, based on the received receiver signal, by using a first echo canceller which is either a time domain echo canceller or a frequency domain echo canceller, to obtain a first echo-cancelled signal; implementing echo cancellation again on the first echo-cancelled signal, based on the received receiver signal, by using a second echo canceller which is the other one of the time domain echo canceller and the frequency domain echo canceller, to obtain a second echo-cancelled signal; wherein, and the first and second echo canceller respectively include the corresponding first and second filters, and the filter parameter of the second filter is updated based on the input receiver signal, the second echo-cancelled signal and the filter parameter of the first filter. By using said method in the present invention, fast response to echo reflecting environment can be achieved with little residual echo, thus the effect of echo cancellation is entirely improved.

16 Claims, 7 Drawing Sheets

ID AND FREQUENCY DOMAIN

APPARATUS AND METHOD FOR CANCELLING ECHO IN JOINT TIME DOMAIN AND FREQUENCY DOMAIN

BENEFIT CLAIMS

This application is a US National Stage of International Application No. PCT/CN2010/080115, filed Dec. 22, 2010, which claims the benefit of CN201010000560.9, filed Jan. 13, 2010.

TECHNICAL FIELD

The present invention relates to the field of echo cancellation, particularly to a device and a method for echo cancellation in joint time-frequency domains.

BACKGROUND

In speech communication, signals from a receiver can merge into signals received by the transmitter via circuitry reflection and acoustic reflection, and are fed to a remote end, resulting in echo there. Echo may interfere with both sides in communication, impact quality of communication and even cause howling in severe cases, which not only makes communication completely impossible, but also might damage communication equipments.

Echo are typically suppressed in speech communication in order to guarantee communication quality and equipment safety. The principle of echo cancellation is as follows: echo signals are generated from receiver signal that are electro-acoustically transformed into practical sound signals to be played back and then reflected by the environment. Both the electro-acoustic conversion process in the receiver and the circumstance reflection may be considered as filtering processes, therefore echo signals may be considered as being generated from receiver signal passing a specific filter.

With traditional methods, a suitable filter is designed to cancel echo so as to eliminate echo signals from receiver signal and prevent echo from interfering with the communication. Reflection environment in actual environment change in real time, which the filter needs to track. Therefore, adaptive filters are generally used as echo path cancellation filters for echo cancellation. The filter may automatically track variation of echo reflecting environment in real time by comparing a receiver signal and a transmitter signal to obtain an accurate echo path for echo cancellation.

Challenges in designing adaptive filters are as follows: 1. In view of the time-varying actual reflection circumstance, the filter must be able to follow changes in time in case that reflection circumstance changes, which means a rapid reaction speed. 2. In case of complex reflection environment and long echo path, it is required that the filter can reflect details of the reflection environment and faithfully simulate the echo path for better echo cancellation and echo residual as little as possible. 3. The filter should not be interfered with by noises and speech at a near end. Generally speaking, the filter design is desired to be rapid, accurate and robust.

Conventional adaptive filtering is typically implemented in time domain or frequency domain. Frequency domain adaptive filtering includes Fourier Transform adaptive filtering, sub-band adaptive filtering and other adaptive filtering in form of time-frequency transformation such as those disclosed in Patent Applications Nos. 200910025855, 200780001928, 200580003444 and 200610144055. Time domain filters react fast to echo and may track echo environment rapidly. However they have more echo residues. Frequency domain adaptive filtering allows for more delicate filter update and low echo residues, but with slow reaction speed. At the moment the communication environment varies, echo would increase significantly, interfering with communication.

It is difficult for a single filter to address both reaction speed and echo residue concerns. Therefore, multiple filters are employed for collective echo cancellation in echo cancellation systems with high performance. Parallel convergence of multiple filters was adopted in the Patent Application No. 200780020102 in which the one with best echo cancellation performance is selected at any given instant as the primary filter for echo cancellation. Some of the multiple filters have a tracking speed first update strategy and some have an echo path estimation accuracy first update strategy. However, with this method utilizing parallel structure, it's necessary to determine accurately convergence of individual filters with different performance and select a currently optimal filter for switching to the filter at different moments. Therefore, they have disadvantages of hard-to-realize system structure and poor stability due to the complex logic.

SUMMARY

To address the above-mentioned problems in prior art, the present invention provides a method and device for echo cancellation in combined time-frequency domains. Said method realizes rapid reaction to echo reflection environment and low echo residue and improves echo cancellation effect as a whole by using an echo canceller in which a time domain filter and a frequency domain filter are cascaded, canceling a portion of echo first with one of the time domain filter and the frequency domain filter and then subjecting signals that have undergone echo cancellation to echo cancellation again with the other of the time domain filter and the frequency domain filter. At the same time, said device for echo cancellation in combined time-frequency domains has a simple structure and is easy to implement.

According to an aspect of the present invention, a method for echo cancellation in combined time-frequency domains is provided, comprising steps of:

receiving a receiver signal and a transmitter signal that are input;

subjecting, by a first echo canceller, the received transmitter signal to echo cancellation based on the received receiver signal to obtain a first echo-cancelled signal;

subjecting, by a second echo canceller, said first echo-cancelled signal to echo cancellation again based on the received receiver signal to obtain a second echo-cancelled signal;

wherein, said first echo canceller is one of a time domain echo canceller and a frequency domain echo canceller, said second echo canceller is the other one of the time domain echo canceller and the frequency domain echo canceller, said first echo canceller comprises a first filter, and said second echo canceller comprises a second filter, and said first and second filters are a time domain filter or a frequency domain filter corresponding to said first and second echo cancellers respectively, the filter parameter of the second filter is updated based on the receiver signal, the second echo-cancelled signal and the filter parameter of the first filter.

According to another aspect of the present invention, a device for echo cancellation in joint time-frequency domains is provided, which comprising:

a first echo canceller configured to receive an input receiver signal and an input transmitter signal, subjects the received transmitter signal to echo cancellation based on the received receiver signal to obtain a first echo-cancelled signal;

a second echo canceller cascaded with the first echo canceller, which is configured to subject said first echo-cancelled signal to echo cancellation again based on the received receiver signal to obtain a second echo-cancelled signal;

wherein said first echo canceller is one of a time domain echo canceller and a frequency domain echo canceller, said second echo canceller is the other one of the time domain echo canceller and the frequency domain echo canceller, said first echo canceller comprises a first filter, said second echo canceller comprises a second filter, and wherein said first and second filters are a time domain filter or a frequency domain filter corresponding to said first and second echo cancellers respectively, and the filter parameter of said second filter is updated based on the receiver signal, said second echo-cancelled signal and the filter parameter of the first filter.

BRIEF DESCRIPTION OF DRAWINGS

The above features and technical advantages of the present invention will become more apparent and easy-to-understand from the following description of embodiments with reference to accompanying drawings.

FIG. 2 shows a flow chart of echo cancellation method in joint time-frequency domains by means of the device for echo cancellation in joint time-frequency domains as shown in FIG. 1a;

FIG. 4 is a flow chart of echo cancellation method in joint time-frequency domains by means of the device for echo cancellation in joint time-frequency domains as shown in FIG. 3a.

DETAIL DESCRIPTION

The present invention will be further described in detail hereinafter in connection with drawings and specific embodiments.

Figure 1A:
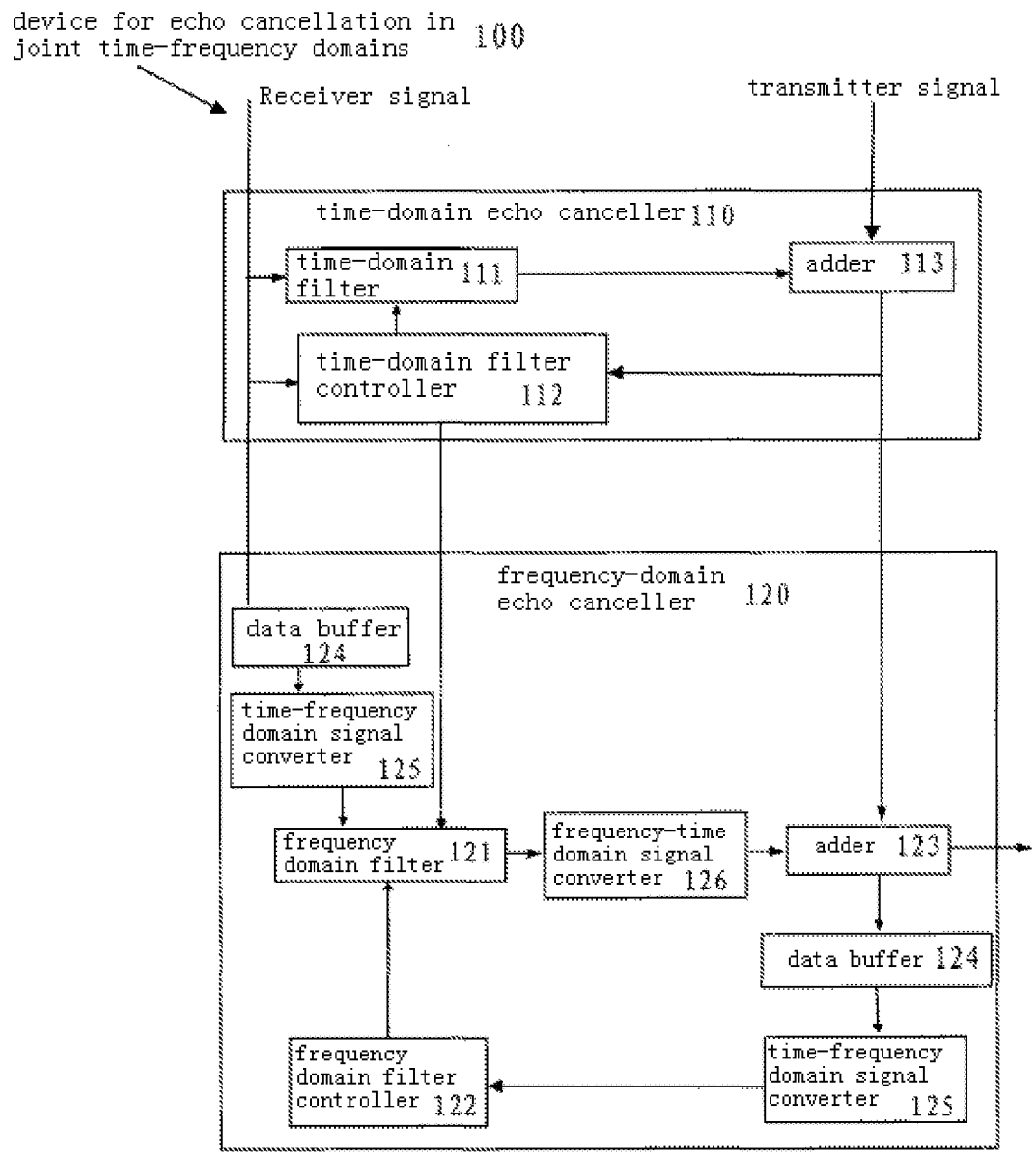
FIGS. 1a and 1b are block diagrams showing respectively two examples of a device for echo cancellation in joint time-frequency domains according to the first embodiment of the present invention.
Figure 1B:
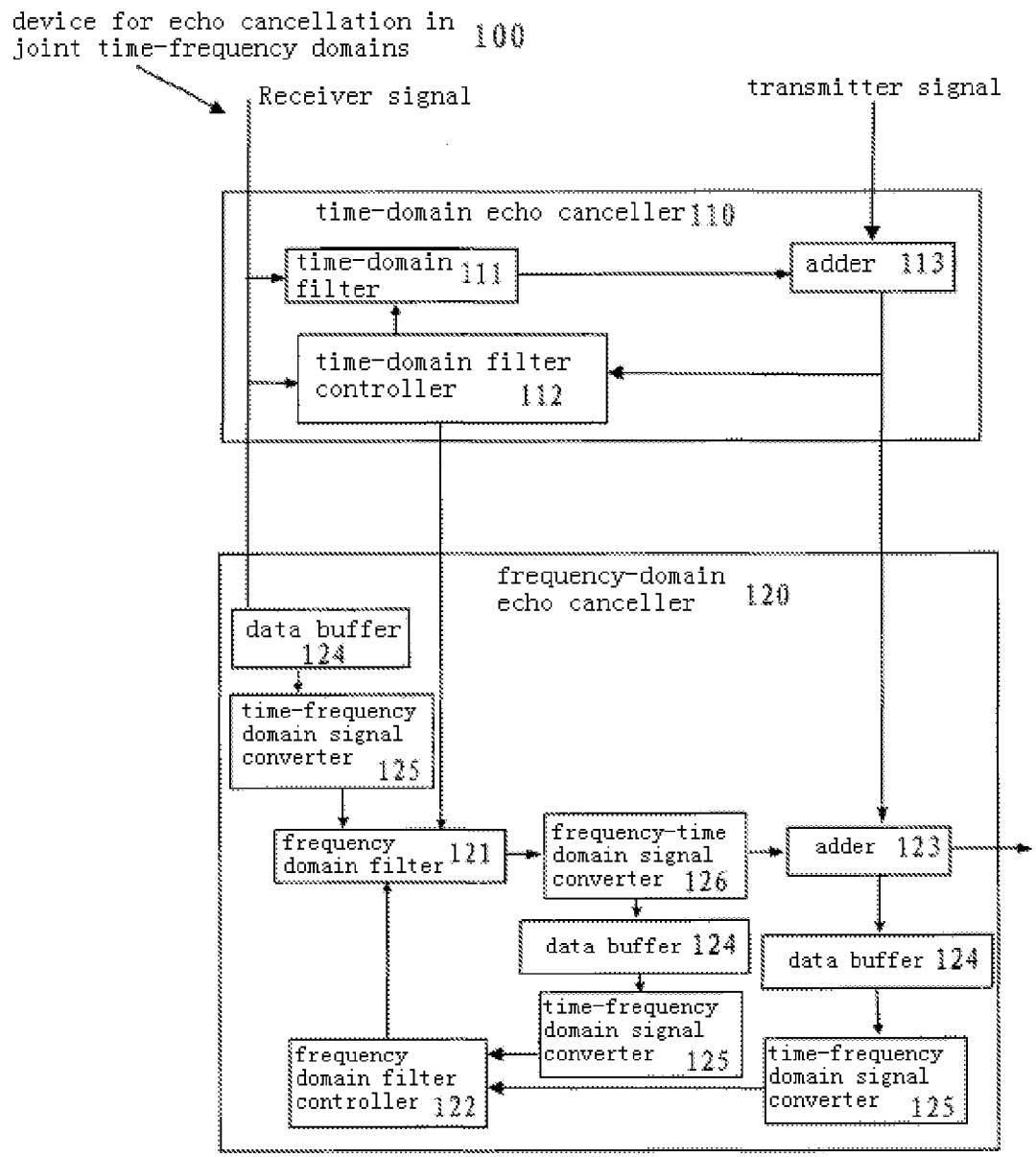

FIGS. 1a and 1b are block diagrams of two examples of a device for echo cancellation in joint time-frequency domains according to the first embodiment of the present invention respectively.

As shown in FIGS. 1a and 1b, according to the first embodiment of the present invention, a device 100 for echo cancellation in joint time-frequency domains includes: a time domain echo canceller 110 that receives an input receiver signal and an input transmitter signal, subjects the received transmitter signal to echo cancellation based on the received receiver signal to obtain time domain echo-cancelled signals; a frequency domain echo canceller 120 cascaded with the time domain echo canceller 110, which subjects the time domain echo-cancelled signals to echo cancellation again based on the received receiver signal x to obtain frequency domain echo-cancelled signals.

Wherein, the time domain echo canceller 110 further includes: a time domain filter 111 for calculating a time domain echo signal based on receiver signal and a filter parameter of the time domain filter 111; a time domain filter controller 112 connected with the time domain filter 111 and a frequency domain filter 121 for calculating a update amount for the filter parameter of the time domain filter based on receiver signal and time domain echo-cancelled signals and outputting said update amount to the time domain filter 111 and the frequency filter 121; and an adder 113 for subtracting the time domain echo signal from the transmitter signal received by the time domain echo canceller 110 to obtain time domain echo-cancelled signals.

The frequency domain echo canceller 120 further includes: a frequency domain filter 121 for calculating frequency domain echo signals based on receiver signal and the filter parameter of the frequency domain filter 121; an adder 123 for subtracting frequency domain echo signals output from the frequency domain filter 121 that have been transformed into time domain from time domain echo-cancelled signals received by the frequency domain echo canceller 120, so as to output frequency domain echo-cancelled signals processed by the frequency domain echo canceller 120; a frequency domain filter controller 122 connected with the frequency domain filter 121 for calculating a update amount for the filter parameter of the frequency domain filter 121 based on the receiver signal, frequency domain echo-cancelled signals and a update amount for the filter parameter of the time domain filter 111 and outputting the update amount for the filter parameter of the frequency domain filter 121 to the frequency domain filter 121; a data buffer 124 connected with a time-to-frequency domain signal converter 125 for organizing a receiver signal or a frequency domain echo-cancelled signal into data frames; a time-to-frequency domain signal converter 125 connected with the frequency domain filter 121 or the frequency domain filter controller 122 for converting the received time domain signals having been organized into data frames into frequency domain; and a frequency-to-time domain signal converter 126 connected with the frequency domain filter 121 for converting the received frequency domain signals into time domain.

In the device 100 for echo cancellation in joint time-frequency domains described in the above-mentioned first embodiment, the example shown in FIG. 1a differs from that shown in FIG. 1b only in that the frequency domain filter controller 122 updates the filter parameter based on different signals. In the example shown in FIG. 1a, the frequency domain filter controller 122 updates the filter parameter based on receiver signal directly converted by the time-to-frequency domain signal converter 125 and frequency domain echo-cancelled signals. While in the example shown in FIG. 1b, only after the receiver signal converted by the time-to-frequency domain signal converter 125 are filtered by the frequency domain filter 121 and converted into frequency domain echo signals by the frequency-to-time domain signal converter 126, the resultant signals can be used together with frequency domain echo-cancelled signals as the basis for the frequency domain filter controller 122 to update the filter parameter.

Figure 2:
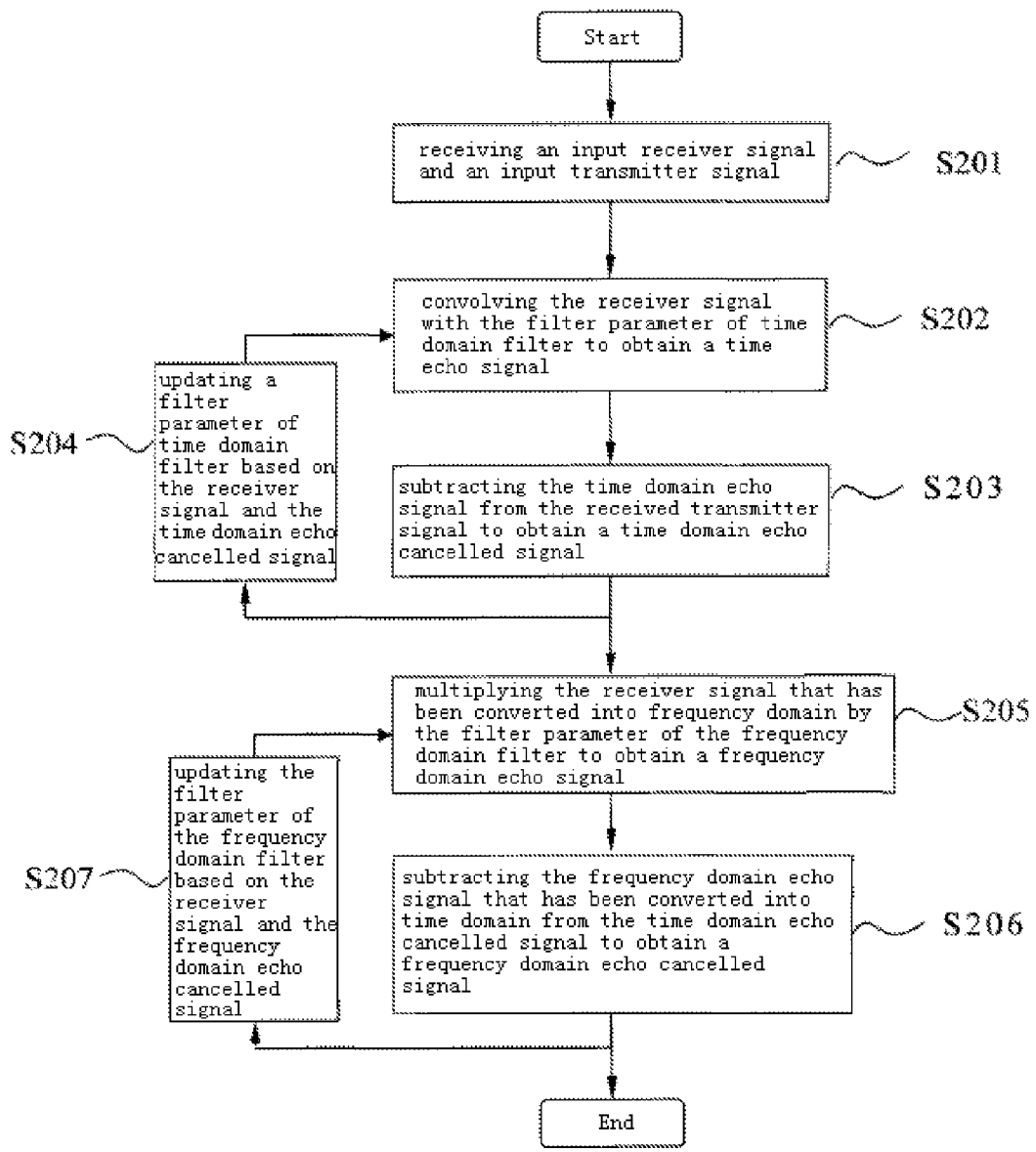

FIG. 2 shows a flow chart of echo cancellation method in joint time-frequency domains by means of the device for echo cancellation in joint time-frequency domains as shown in FIG. 1a. It will be described in detail below with reference to FIG. 2.

As shown in FIG. 2, said method begins with step S201. In step S201, the time domain echo canceller 110 receives the input receiver signal x and the input transmitter signal d mixed with echo.

First of all, the time domain echo canceller 110 subjects the received transmitter signal d to echo cancellation based on the received receiver signal x to obtain time domain echo-cancelled signals et. Specifically, in step S202, the time domain filter 111 convolves receiver signal x with the filter parameter h of the time domain filter 111 to obtain the time domain echo signal. In step S203, the adder 113 subtracts the time domain echo signal from the transmitter signal d to obtain time domain echo-cancelled signals et, as shown in equation 1, wherein n denotes the current instant point.

$$et(n)=d(n)-x(n)*h(n) \quad \text{Equation 1}$$

In step S204, the time domain filter controller 112 updates the filter parameter of the time domain filter 111 based on receiver signal x and time domain echo-cancelled signals. Specific mode for the update is as follows. The time domain filter controller 112 multiplies et by receiver signal x and then divides the product by the power of x for baseline update amount. Constant c is used as the update step size. Then, the time domain filter controller 112 multiplies the baseline update amount by the update step size to obtain an update amount $\Delta h(l)$ for the filter parameter h of the time domain filter 111, and outputs the update amount $\Delta h(l)$ to the time domain filter 111 and the frequency domain filter 121 respectively to complete update. Refer to Equation 2 as the update equation, wherein l denotes a $l^{th}$ weight value of the time domain filter 111, L denotes the length of the time domain filter 111, n denotes current moment, x(n−l+1) denotes sample value at moment n−l+1 of receiver signal x, et(n) denotes time domain echo-cancelled signals at current moment, $h(l)_{new}$ denotes updated filter parameter of the time domain filter, $h(l)_{old}$ denotes the filter parameter of the time domain filter 111 before update, and c denotes a constant.

$$\Delta h(l) = \frac{x(n-l+1)et(n)}{E(x^2)}c, \ 0 \le c \le 1 \quad \text{Equation 2}$$

$$h(l)_{new} = h(l)_{old} + \Delta h(l), \ L \ge l \ge 1$$

As can be seen from Equation 2, the time domain filter is updated point by point with a fast update speed, which allows keeping up with the echo environment and echo path when they change fast.

Then, the frequency domain echo canceller 120 subjects the time domain echo-cancelled signals et output from the time domain echo canceller to a further echo cancellation based on the received receiver signal x, so as to obtain frequency domain echo-cancelled signal ef. In particular, signals input to the frequency domain echo canceller 120 are receiver signal x and time domain echo signal et, and the receiver signal x constitutes data frames via the data buffer 124. The time-to-frequency domain signal converter 125 converts receiver signal x that has been built into data frames from time domain to frequency domain with an converting equation as shown in the following formula 3, in which k denotes a frequency point and M denotes the length of the data buffer 124. The time-to-frequency domain signal converter 125 may be implemented with Fourier Transform or sub-band filtering. In step S205, the receiver signal X that has been converted into frequency domain is multiplied by a filter parameter H of the frequency domain filter 121 to obtain a frequency domain echo signal Echo in frequency domain form, as shown in the following Equation 4. Next, the frequency-to-time domain signal converter 126 converts the frequency domain echo signal Echo from frequency domain to time domain to obtain a frequency domain echo signal in time domain form. The frequency-to-time domain signal converter 126 may realize frequency domain to time domain signal conversion with Fourier Transform or sub-band filtering. In step S206, the adder 123 subtracts the above-mentioned frequency domain echo signal that has been converted into time domain from the time domain echo-cancelled signal et to obtain frequency domain echo-cancelled signal ef, as shown in the following Equation 5, in which 1/M is a constant factor used when converting from frequency domain to time domain.

$$X(k) = \sum_{m=1}^{M} x(n-M+m)W^{k(m-1)} \quad \text{Equation 3}$$

$$\text{Echo}(k) = X(k)H(k) \quad \text{Equation 4}$$

$$ef(n) = et(n) - \frac{1}{M}\sum_{k=1}^{M} \text{Echo}(k)W^{-nk}, \quad \text{Equation 5}$$

$$W = \exp\left(-j\frac{2\pi}{M}\right)$$

In step S207, the process of updating the filter parameter H of the frequency domain filter 121 is described: update the filter parameter of the frequency domain filter based on a receiver signal, a frequency echo-cancelled signal and an update amount of the filter parameter of the time domain filter. In particular, the frequency domain echo-cancelled signal ef constitutes data frames via the data buffer 124. The time-to-frequency domain signal converter 125 converts the frequency domain echo-cancelled signal ef that has been built into data frames from time domain to frequency domain form ef with a time-to-frequency domain conversion equation shown in Equation 6. Next, the frequency domain filter controller 122 calculates a coherence function between receiver signal X that has been converted into frequency domain and the frequency domain echo-cancelled signal Ef to determine update step size of the frequency domain filter. The coherence function has a value ranging from 0 to 1. A coherence function of value 1 indicates completely similar signals, meaning that there is echo residue and the frequency domain filter should be updated to update the weight value. A coherence function of value 0 indicates completely different signals, meaning that there is no echo residue and the frequency domain filter needs no modification. The larger the value of the coherence function, the more quickly the frequency domain filter is updated. Furthermore, since the coherence function is a function of frequency, larger values of coherence function in a certain frequency band mean that signals in this band have stronger similarity. The frequency domain filter controller 122 calculates the update step size C[k] for the frequency domain filter 121 with the coherence function by means of a method expressed in Equation 7. Ef is multiplied by X and then divided by power of X to obtain the baseline update amount. The baseline update amount is multiplied by the update step size C[k] to obtain an update amount $\Delta H[k]$ for the filter parameter of the frequency domain filter 121. Then the frequency domain filter controller 122 adds the update amount $\Delta H[k]$ to the preceding filter parameter of the frequency domain filter, and subtracts the update amount $\Delta h(l)$ for the filter parameter of the time domain filter 111 therefrom to complete the update. The update formula for the frequency domain filter 121 is expressed with Equation 8, in which H(k)$_{new}$ represents the updated filter parameter of the frequency domain filter, H(k)$_{old}$ represents the filter parameter of the frequency domain filter before update.

$$Ef(k) = \sum_{n}^{M} ef(n)W^{-kn}, W = \exp\left(-j\frac{2\pi}{M}\right) \quad \text{Equation 6}$$

$$C[k] = \min\left(\frac{E(X[k]Ef[k])^2}{E(X[k]^2)E(Ef[k]^2)}, 1\right) \quad \text{Equation 7}$$

$$\Delta H[k] = \frac{X[k]Ef[k]C[k]}{E(X[k]^2)}$$

$$H[k]_{new} = H[k]_{old} + \Delta H[k] - \frac{1}{M}\sum_{l=1}^{L}\Delta h(l)W^{lk}, \quad \text{Equation 8}$$

$$W = \exp\left(-j\frac{2\pi}{M}\right)$$

For FIG. 1b, the corresponding flow of the echo cancellation method in joint time-frequency domains is similar to that shown in FIG. 2. They differ in that, in terms of step 207, for the example shown in FIG. 1b, simply modifying the step 207 in FIG. 2 as "updating the filter parameter of the frequency domain filter based on the frequency domain echo signals and the frequency domain echo-cancelled signal and an update amount of the parameter of the time domain filter" will be sufficient.

In the process of updating the frequency domain filter, there are two ways to determine whether the filter needs update. One is to make decision on the basis of similarity between the receiver signal X and the frequency domain echo-cancelled signal Ef output from the frequency domain echo canceller, that is, the determination mode shown in FIGS. 1a and 2. The other way is to make decision on the basis of similarity between echo estimation signal y resulted from filtering in frequency domain the receiver signal (that is, the frequency domain echo signal Echo after being converted by the frequency-to-time domain signal converter 126 in FIG. 1b) and the frequency domain echo-cancelled signal Ef output from the frequency domain echo canceller, that is, the determination mode shown in FIG. 1b. These two ways are equivalent, in which the similarity is expressed by a coherence function.

In particular, in the example shown in FIG. 1b, the update process for the filter parameter H of the frequency domain filter 121 is as follows:

The frequency domain echo-cancelled signal ef constitutes data frames via the data buffer 124. The time-to-frequency domain signal converter 125 converts the frequency domain echo-cancelled signal ef that has been built into data frames from time domain to frequency domain form ef with a time-to-frequency domain conversion equation shown in Equation 6. The resultant frequency domain echo signal Echo obtained in step 205 is built into data frames through the data buffer 124, and the time-to-frequency domain signal converter 125 converts the frequency domain echo signals Echo that has been built into data frames from time domain into frequency domain form Echo. Next, the frequency domain filter controller 122 calculates a coherence function between the frequency domain echo signal ECHO and the frequency domain echo-cancelled signal Ef to determine update step size of the frequency domain filter. The coherence function has a value ranging from 0 to 1. A coherence function of value 1 indicates completely similar signals, meaning that there is echo residue and the frequency domain filter should be updated to update the weight value. A coherence function of value 0 indicates completely different signals, meaning that there is no echo residue and the frequency domain filter needs no modification. The larger the value of coherence function, the more quickly the frequency domain filter is updated. Furthermore, since the coherence function is a function of frequency, larger values of coherence function in a certain band means that signals in this segment have stronger similarity.

For the determination mode shown in FIG. 1b, the frequency domain filter controller 122 calculates the update step size C[k] for the frequency domain filter 121 with the coherence function, with a calculation method expressed in Equation 9:

$$C[k] = \min\left(\frac{E(Y[k]Ef[k])^2}{E(Y[k]^2)E(Ef[k]^2)}, 1\right) \quad \text{Equation 9}$$

In which E( ) represents an operation for calculating a expected value, Y represents the frequency domain form (i.e. the frequency domain echo signal) of the echo estimate signal Y, and k represents a frequency point. Calculation of Y is expressed in Equation 10:

$$Y(k) = \sum_{m=1}^{M} y(n - M + m)W^{km}, W = \exp\left(-j\frac{2\pi}{M}\right) \quad \text{Equation 10}$$

In which k represents a frequency point, n represents a time point and M is the length of the data register.

Next, Ef is multiplied by Y and then divided by power of Y to obtain the baseline update amount. The baseline update amount is multiplied by the update step size C[k] to obtain an update amount ΔH[k] for the filter parameter of the frequency domain filter 121. Then the frequency domain filter controller 122 adds the update amount ΔH[k] to the preceding filter parameter of the frequency domain filter, and subtracts the update amount Δh(l) for the filter parameter of the time domain filter 111 therefrom so as to complete the update.

Figure 3A:
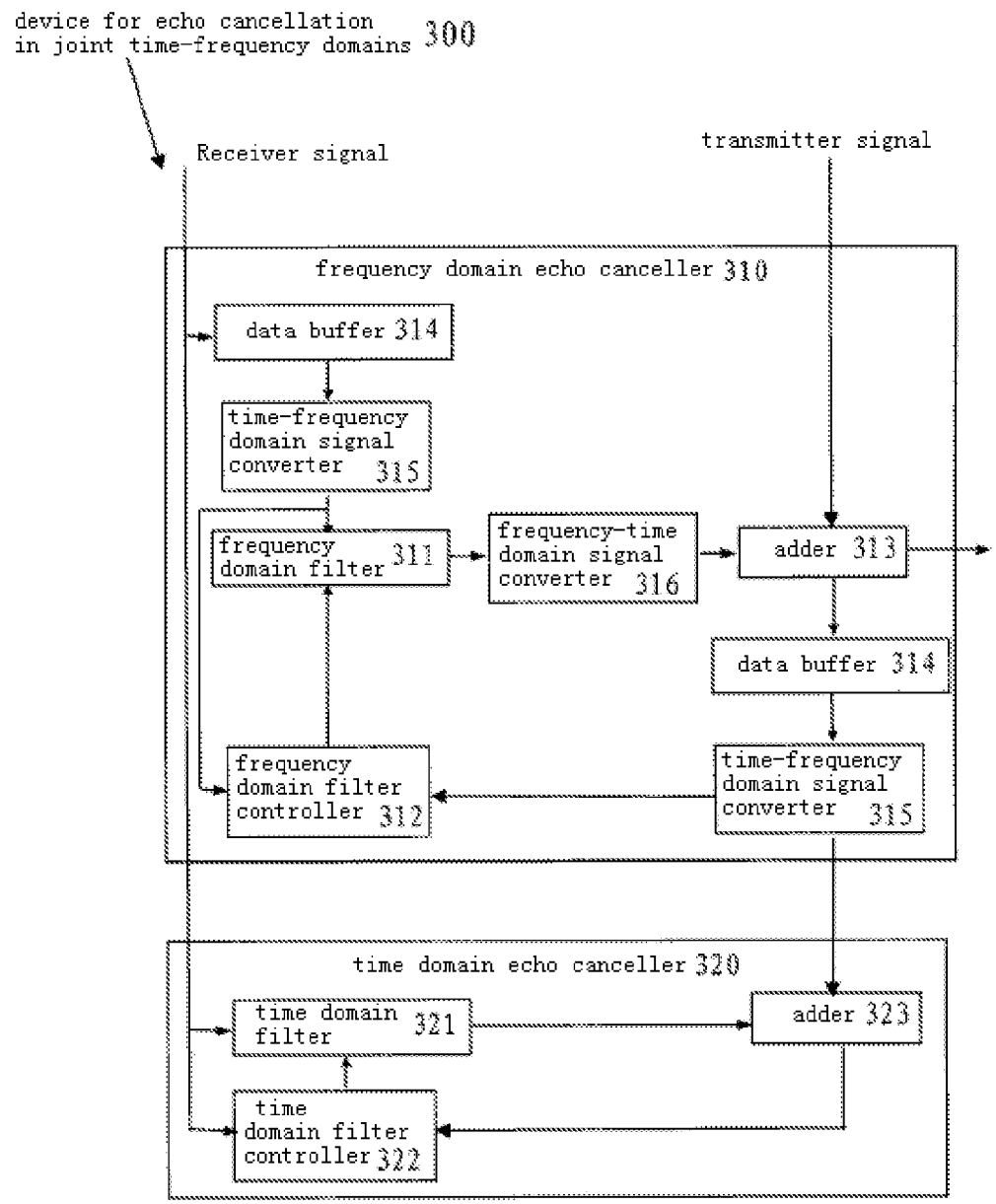
FIGS. 3a and 3b are block diagrams showing respectively two examples of a device for echo cancellation in joint time-frequency domains according to the second embodiment of the present invention.
Figure 3B:
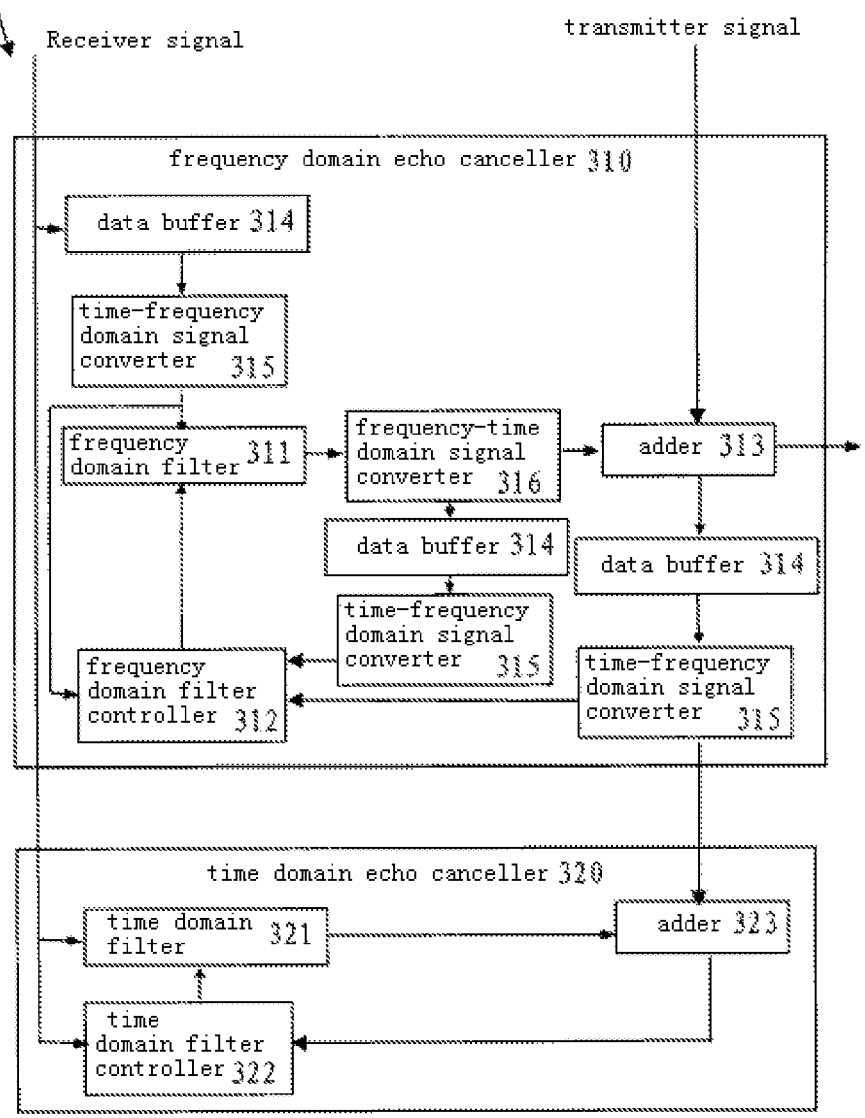

In the above-mentioned embodiments, the time domain echo canceller is used as a first echo canceller for the first echo cancellation, and the frequency domain echo canceller is cascaded with the time domain echo canceller and used as a second echo canceller for the second echo cancellation on the first echo-cancelled signal that has been subjected to the first echo cancellation. FIGS. 3a and 3b are block diagrams of two examples of a device for echo cancellation in joint time-frequency domains according to the second embodiment of the present invention. As shown in FIGS. 3a and 3b, in the second embodiment of the present invention, the frequency domain echo canceller 310 is used as a first echo canceller for the first echo cancellation, and the time domain echo canceller 320 is cascaded with the frequency domain echo canceller 310 and used as a second echo canceller for the second echo cancellation on the first echo-cancelled signal that has been subjected to the first echo cancellation. The frequency domain echo canceller 310 in the devices 300 for echo cancellation in joint time-frequency domains shown in FIGS. 3a and 3b are identical in structure with the frequency domain echo canceller 120 in the devices 100 for echo cancellation in joint time-frequency domains shown in FIGS. 1a and 1b respectively, except the different cascading order between the time domain echo canceller and the frequency domain echo canceller. That is, in the device 300 for echo cancellation in joint time-frequency domains as described in the second embodiment, the example shown in FIG. 3a differs from that shown in FIG. 3b only in that the frequency domain filter controller 312 updates the filter parameter based on different signals. In the example shown in FIG. 3a, the frequency domain filter controller 312 updates the filter parameter based on a receiver signal directly converted by the time-to-frequency domain signal converter 315 and a frequency domain echo-cancelled signal. While in the example shown in FIG. 3b, only after a receiver signal converted by the time-to-frequency domain signal converter 315 is filtered by the frequency domain filter 311 and converted into a frequency domain echo signal by the frequency-to-time domain signal converter 316, the resultant signal can be used together with frequency domain echo-cancelled signal as the basis for the frequency domain filter controller 312 to update the filter parameter.

Figure 4:
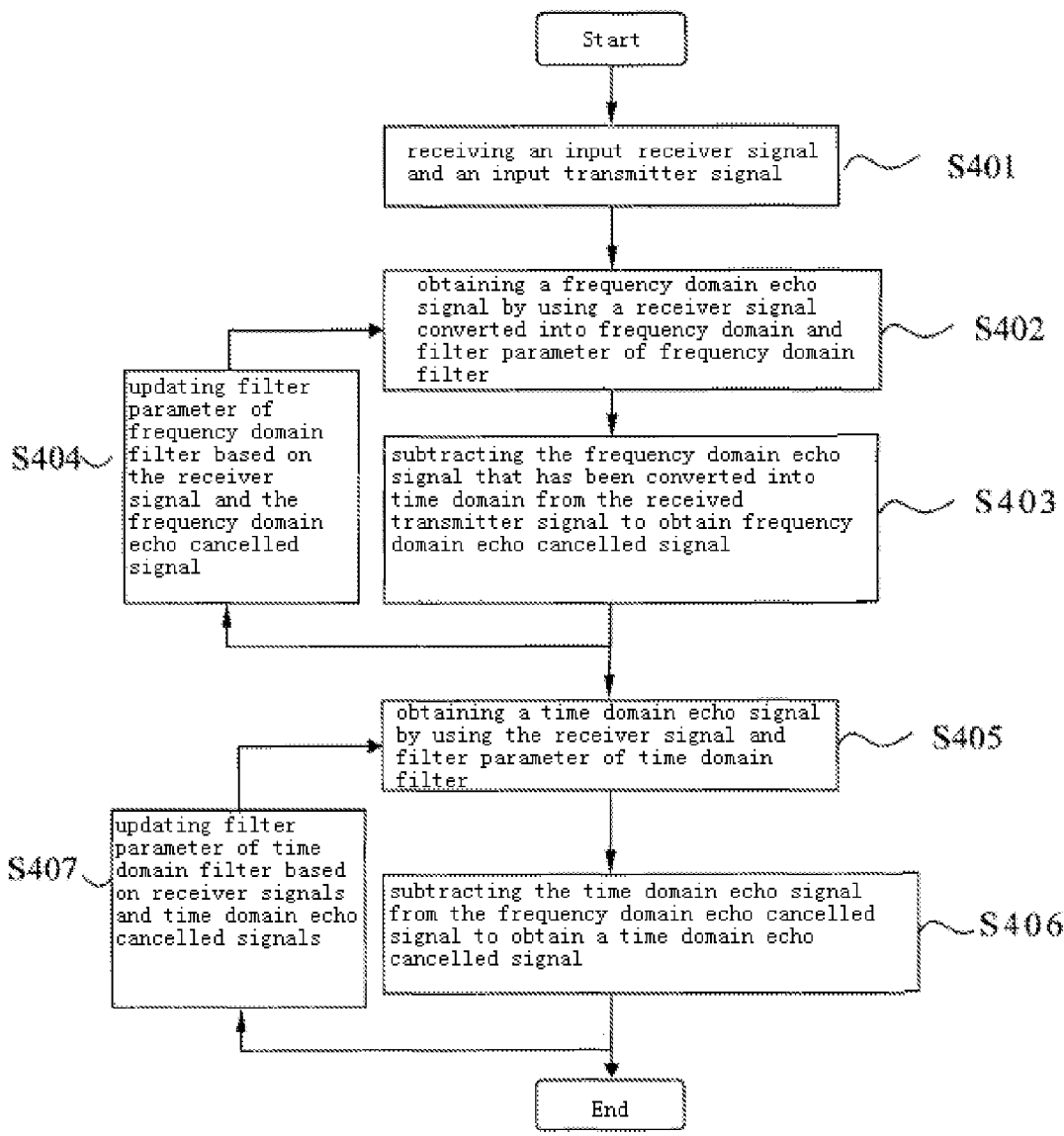

In addition to that, the time domain echo canceller 320 in the device 300 for echo cancellation in joint time-frequency domains has an identical structure with the time domain echo canceller 110 in the device 100 for echo cancellation in joint time-frequency domains, detail description thereof is therefore omitted. FIG. 4 shows a flow chart of echo cancellation method in joint time-frequency domains by means of the device for echo cancellation in joint time-frequency domains shown in FIG. 3a. Said method is substantially the same as that shown in FIG. 2 except the order of steps of echo cancellation, therefore detail description of same steps is omitted herein.

As shown in FIG. 4, said method begins with step S401. In step S401, the frequency domain echo canceller 310 receives an input receiver signal x and an input transmitter signal d.

First of all, the frequency domain echo canceller 310 subjects the received transmitter signal d to echo cancellation based on the received receiver signal x, so as to obtain frequency domain echo-cancelled signal ef. In particular, the data buffer 314 organizes receiver signal x into data frames. The time-to-frequency domain signal converter 315 converts the receiver signal x that has been built into data frames from time domain into frequency domain with a conversion equation same as the above equation 3. In step S402, the frequency domain filter 311 multiplies the receiver signal X that has been converted into frequency domain by a filter parameter H of the frequency domain filter to obtain a frequency domain echo signal Echo, which is same as the above Equation 4. Next, the frequency-to-time domain signal converter 316 converts the frequency domain echo signal Echo from frequency domain into time domain. In step S403, the adder 313 subtracts the frequency domain echo signal Echo that has been converted into time domain from the transmitter signal d to obtain the frequency domain echo-cancelled signal ef, which is expressed in the following Equation 11.

$$ef(n) = d(n) - \frac{1}{M}\sum_{k=1}^{M} \text{Echo}(k)W^{-kn}, \quad W = \exp\left(-j\frac{2\pi}{M}\right) \quad \text{Equation 11}$$

In step S404, the update process for the filter parameter H of the frequency domain filter 121 is described, which is substantially the same as that of the above-mentioned step S207. In particular, the data buffer 314 organizes the frequency domain echo-cancelled signal ef into data frames. The time-to-frequency domain signal converter 315 converts the frequency domain echo-cancelled signal ef that has been built into data frames from time domain to frequency domain form into Ef with a time-to-frequency domain conversion equation same as the above-mentioned Equation 6. The frequency domain filter controller 312 calculates the update step size C[k] for the frequency domain filter 311 by using the coherence function by means of a method same as the above-mentioned Equation 7. Ef is multiplied by X and then divided by the power of X to obtain the baseline update amount. The baseline update amount is multiplied by the update step size C[k] to obtain an update amount ΔH[k] for the filter parameter of the frequency domain filter 311, and then the frequency domain filter controller 312 adds the update amount ΔH[k] to the preceding frequency domain filter to complete the update. The update equation for the frequency domain filter 311 is expressed as Equation 12.

$$\Delta H[k] = \frac{X[k]Ef[k]C[k]}{E(X[k]^2)}, \quad W = \exp\left(-j\frac{2\pi}{M}\right) \quad \text{Equation 12}$$

$$H[k]_{new} = H[k]_{old} + \Delta H[k]$$

In step S405, the time domain filter 321 convolves receiver signal x with the filter parameter h of the time domain filter to obtain a time domain echo signal. In step S406, the adder 323 subtracts the time domain echo signal from the frequency domain echo-cancelled signal ef to obtain time domain echo-cancelled signal et, wherein the formula used in the calculation is expressed in the following Equation 13, wherein n denotes the current instant point.

$$et(n)=ef(n)-x(n)*h(n) \quad \text{Equation 13}$$

In step S407, the time domain filter controller 322 updates the filter parameter h of the time domain filter based on the receiver signal x and the time domain echo-cancelled signal as well as an update amount of the parameter of the frequency domain filter. As for specific update mode, the time domain filter controller 322 multiplies et by the receiver signal x and then divides the product by the power of x, and the quotient being used as the baseline update amount. Constant c is used as the update step size. The time domain filter controller 322 multiplies the baseline update amount by the update step size to obtain an update amount Δh(l) for the filter parameter h of the time domain filter 321, then outputs the update amount Δh(l) to the time domain filter 321 and adds it to the current filter parameter of the time domain filter to obtain a new filter parameter of the time domain filter, wherein the equation used for the update is the same as the above-mentioned Equation 2.

Preferably, in other embodiments of the present invention, the filter parameter of the time domain filter 321 is not updated independently, but influenced by the update amount ΔH[k] for the filter parameter of the frequency domain filter 311, so as to optimize the filter parameter h of the time domain filter 321 and enhance its update speed. That is, the update amount ΔH[k] for the filter parameter of the frequency domain filter 311 is further subtracted from $h(l)_{new}$ calculated with Equation 2 to obtain updated filter parameter of the time domain filter, wherein the method for calculation is expressed as Equation 14.

$$\Delta h(l) = \frac{x(n-l+1)et(n)}{E(x^2)}c, \quad 0 \le c \le 1 \quad \text{Equation 14}$$

$$h(l)_{new} = h(l)_{old} + \Delta h(l) - \frac{1}{M}\sum_{k}^{M} \Delta H(k)W^{-lk},$$

$$W = \exp\left(-j\frac{2\pi}{M}\right), \quad L \ge l \ge 1$$

Again, as for FIG. 3b, the corresponding flow of the echo cancellation method in joint time-frequency domains is similar to that shown in FIG. 4. They differ in that, in terms of step 404, for the example shown in FIG. 3b, simply modifying the step 404 in FIG. 4 as "updating the filter parameter of the frequency domain filter based on the frequency domain echo signal and the frequency domain echo-cancelled signal" will be sufficient. In the example shown in FIG. 3b, the filter parameter of the frequency domain filter 311 has a similar update process to that for the filter parameter of the frequency domain filter 121 shown in FIG. 1b, therefore it will not be repeated anymore.

Figure 5:
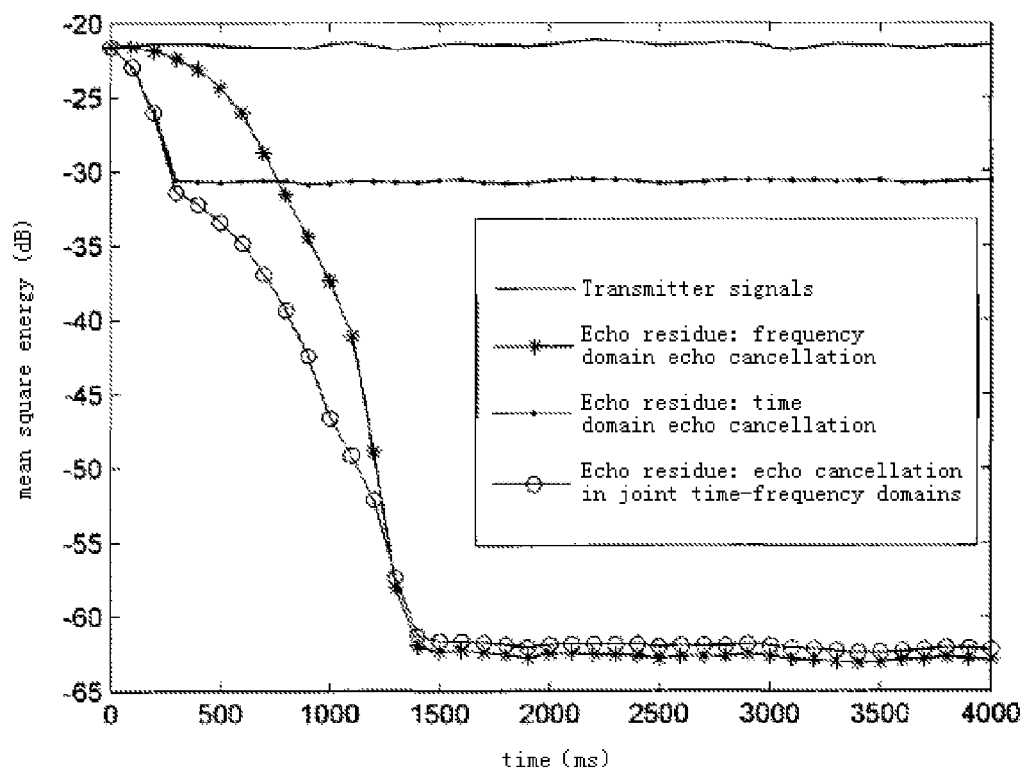
FIG. 5 is a graph showing echo cancellation effects of the echo cancellation method in joint time-frequency domains according to embodiments of the present invention vs. prior art echo cancellation method.

FIG. 5 a graph showing echo cancellation effects of the echo cancellation method in joint time-frequency domains according to an embodiment of the present invention vs. a method of a comparative example. In the echo cancellation test, the receiver signal is white noises, there is no speech at the near end, and the transmitter signal are pure echo signals. FIG. 5 shows comparative results of several different echo cancellation methods, in which the curves in the graph represent signal energy, and time is counted from the time when the receiver signal occurs (zero of the time axis). In particular, the smooth curve represents original transmitter signal and other three curves represent echo residue energy resulted from three different methods, in which the curve with stars represents the result of frequency domain echo cancellation, the curve with dots represents the result of time domain echo cancellation and the curve with circles represents the result of the echo cancellation in joint time-frequency domains according to an embodiment of the present invention. In FIG. 5, the faster a energy curve drops, the faster the reaction speed of the echo cancellation system, and the lower a curve is, the less the echo residue. As can be seen from FIG. 5, the effect of the echo cancellation in joint time-frequency domains according to the present invention has a reaction speed equivalent to that of time domain echo cancellation and echo residue equivalent to that of frequency domain echo cancellation. The energy of echo residue is lower than the other two methods.

It can be seen from the above detail description of embodiments of the present invention with reference to drawings that, the method and device for echo cancellation in joint time-frequency domains provided in the present invention make the time domain echo canceller and the frequency domain echo canceller have complementary effects to each other and have advantages of both time domain filters and frequency domain filters. Frequency domain filters may simulate details of an echo path and at the same time, time domain filters may follow environmental changes rapidly when the echo path changes, which allows both fast echo cancellation speed and low echo residue.

With the above teaching of the present invention, those skilled in the art may make various improvements and modifications on the basis of the above-mentioned embodiments, all of which are intended to be in the scope of the present invention. Those skilled in the art should appreciate that the above specific description is only for the purpose of better understanding the present invention and the scope of the present invention is defined by the claims and their equivalents.

The invention claimed is:

1. A method for echo cancellation in joint time-frequency domains comprising:
   receiving an input receiver signal and an input transmitter signal;
   subjecting, by a first echo canceller, the received transmitter signal to echo cancellation based on the received receiver signal to obtain a first echo-cancelled signal;
   subjecting, by a second echo canceller, said first echo-cancelled signal to echo cancellation again based on the received receiver signal to obtain a second echo-cancelled signal;
   wherein said first echo canceller is one of a time domain echo canceller and a frequency domain echo canceller, said second echo canceller is the other one of the time domain echo canceller and the frequency domain echo canceller, said first echo canceller comprises a first filter, and said second echo canceller comprises a second filter, and wherein said first and second filters are a time domain filter or a frequency domain filter in conformity with said first and second echo cancellers respectively, and the filter parameter of the second filter is updated based on the input receiver signal, the second echo-cancelled signal and the filter parameter of the first filter.

2. The method according to claim 1, wherein, when said first echo canceller is a time domain echo canceller and said second echo canceller is a frequency domain echo canceller, said step of canceling echo with the first echo canceller comprises:
   convolving said receiver signal with the filter parameter of said first filter to obtain the first echo signal;
   subtracting said first echo signal from the received transmitter signal to obtain said first echo-cancelled signal;
   wherein, the filter parameter of said first filter is updated based on said receiver signal and said first echo-cancelled signal;
   the step of canceling echo with the second echo canceller comprises:
   conducting said receiver signal that has been converted into frequency domain by the filter parameter of said second filter to obtain the second echo signal; converting said second echo signal from frequency domain into time domain;
   subtracting said second echo signal that has been converted into time domain from the first echo-cancelled signal to obtain said second echo-cancelled signal.

3. The method according to claim 2, wherein, update of the filter parameter of said second filter comprises steps of:
   converting said receiver signal and said second echo-cancelled signal from time domain into frequency domain;
   calculating an update step size and a baseline update amount of the second filter based on said receiver signal and said second echo-cancelled signal that have been converted into frequency domain;
   multiplying the update step size of said second filter by the baseline update amount to obtain an update amount for the filter parameter of the second filter;
   updating the filter parameter of said second filter based on the update amount for the filter parameter of said second filter and the update amount for the filter parameter of said first filter.

4. The method according to claim 3, wherein, before converting said receiver signal and said second echo-cancelled signal from time domain into frequency domain, organizing, by a data buffer, said receiver signal and said second echo-cancelled signal into data frames respectively and updating the filter parameter of said second filter according to the following formula:

$$\Delta H[k] = \frac{X[k]Ef[k]C[k]}{E(Ef[k]^2)}$$

$$H[k]_{new} = H[k]_{old} + \Delta H[k] - \frac{1}{M}\sum_{l=1}^{L}\Delta h(l)W^{lk}, W = \exp\left(-j\frac{2\pi}{M}\right)$$

wherein k represents a frequency point, C[k] represents the update step size for said second filter, X[k] represents the receiver signal that has been converted into frequency domain, Ef[k] represents said second echo-cancelled signal that has been converted into frequency domain, M represents a length of said data buffer, ΔH(k) represents an update amount for the filter parameter of said second filter, Δh(l) represents an update amount for the filter parameter of said first filter, H(k)$_{new}$ represents updated filter parameter of said second filter, H(k)$_{old}$ represents the filter parameter of said second filter before update.

5. The method according to claim 2, wherein, the update of the filter parameter of said second filter comprises steps of:
converting said receiver signal and said second echo-cancelled signal from time domain into frequency domain;
multiplying the receiver signal that has been converted into frequency domain by the filter parameter of said second filter to obtain second echo signals;
converting said second echo signal from frequency domain into time domain, organizing them into data frames via the data buffer and converting the data frames from time domain back into frequency domain;
calculating an update step size and a baseline update amount of the second filter based on said second echo signal and said second echo-cancelled signal that have been converted into frequency domain;
multiplying the update step size of said second filter by the baseline update amount to obtain an update amount for the filter parameter of the second filter;
updating the filter parameter of said second filter based on the update amount for the filter parameter of said second filter and the update amount for the filter parameter of said first filter.

6. The method according to claim 1, wherein, in a case that said first echo canceller is a frequency domain echo canceller and said second echo canceller is a time domain echo canceller, said step of canceling echo with the first echo canceller comprises:
converting said receiver signal from time domain into frequency domain;
multiplying the receiver signal that has been converted into frequency domain by the filter parameter of said first filter to obtain first echo signal;
converting said first echo signal from frequency domain into time domain;
subtracting said first echo signal that has been converted into time domain from the received transmitter signal to obtain said first echo-cancelled signal;
said step of canceling echo with the second echo canceller comprises:
convolving said receiver signal with the filter parameter of said second filter to obtain the second echo signal;
subtracting said second echo signal from the first echo-cancelled signal to obtain said second echo-cancelled signal.

7. The method according to claim 6, wherein, the update of the filter parameter of said first filter comprises steps of:
converting said first echo-cancelled signal from time domain into frequency domain;
calculating an update step size and a baseline update amount of the first filter based on said receiver signal domain and said first echo-cancelled signal that have been converted into frequency;
multiplying the update step size of said first filter by the baseline update amount to obtain an update amount for the filter parameter of the first filter;
updating the filter parameter of said first filter based on the update amount for the filter parameter of said first filter.

8. The method according to claim 6, wherein, the update of the filter parameter of said first filter comprises steps of:
converting said first echo-cancelled signal and said first echo signal that has been converted into time domain from time domain into frequency domain;
calculating an update step size and a baseline update amount of the first filter based on said first echo signal that has been converted into frequency domain and said first echo-cancelled signal;
multiplying the update step size of said first filter by the baseline update amount to obtain an update amount for the filter parameter of the first filter;
updating the filter parameter of said first filter based on the update amount for the filter parameter of said first filter.

9. The method according to claim 7 or 8, wherein, the filter parameter of said first filter is updated based on the following formula:

$$\Delta h(l) = \frac{x(n-l+1)et(n)}{E(x^2)} *c, 0 \le c \le 1$$

$$h(l)_{new} = h(l)_{old} + \Delta h(l) - \frac{1}{M}\sum_{k=1}^{M}\Delta H(k)W^{-lk},$$

$$W = \exp\left(-j\frac{2\pi}{M}\right), L \ge l \ge 1$$

Wherein l represents a l$^{th}$ weight value of said second filter, Δh(l) represents an update amount of the filter parameter of said second filter, n represents a current moment, x(n−l+1) represents a sample value at moment n−l+1 of said receiver signal x, et(n) represents said echo-cancelled signal in time domain at the current moment, h(l)$_{new}$ represents updated filter parameter of said second filter, h(l)$_{old}$ represents the filter parameter of said second filter before update, M represents a length of said data buffer, L represents a length of said second filter, and c represents a constant, ΔH(k) represents an update amount of the filter parameter of the first filter.

10. A device for echo cancellation in joint time-frequency domains comprising:
a first echo canceller configured to receive an input receiver signal and an input transmitter signal, subject the received transmitter signal to echo cancellation based on the received receiver signal, so as to obtain a first echo-cancelled signal;
a second echo canceller cascaded with the first echo canceller, which is configured to subject said first echo-cancelled signal to a further echo cancellation based on the received receiver signal to obtain a second echo-cancelled signal;
wherein said first echo canceller is one of a time domain echo canceller and a frequency domain echo canceller, said second echo canceller is the other one of the time domain echo canceller and the frequency domain echo canceller, said first echo canceller comprises a first filter, said second echo canceller comprises a second filter, and wherein said first and second filters are a time domain filter or a frequency domain filter in conformity with said first and second echo cancellers respectively, further, the filter parameter of said second filter is updated based on the receiver signal, said second echo-cancelled signal, and the filter parameter of the first filter.

11. The device according to claim 10, wherein said frequency domain echo canceller further comprises:
an adder for subtracting a frequency domain echo signal output from said frequency domain filter which has been converted into time domain from a signal received by said frequency domain echo canceller, so as to output a frequency domain echo-cancelled signal that has been processed by said frequency domain echo canceller;
a frequency domain filter controller connected with said frequency domain filter, configured to calculate an update amount for the filter parameter of said frequency domain filter based on said receiver signal or said frequency domain echo signal as well as the frequency domain echo-cancelled signal and output said update amount to said frequency domain filter;
a time-to-frequency domain signal converter connected with the frequency domain filter and the frequency domain filter controller, for converting received time domain signals into frequency domain; and
a frequency-to-time domain signal converter connected with the frequency domain filter, for converting received frequency domain signals into time domain;
a data buffer connected with the time-to-frequency domain signal converter, for organizing said receiver signal, said frequency domain echo signal and the echo-cancelled signal output from said frequency domain echo canceller into data frames.

12. The device according to claim 11, wherein, in a case where the frequency domain echo canceller is used as the first echo canceller, said frequency domain filter controller is further connected with said time domain filter of the second echo canceller, and outputs said update amount to said time domain filter, the filter parameter of said time domain filter is further updated based on the update amount for the filter parameter of said frequency domain filter.

13. The device according to claim 11, wherein, in a case that said frequency domain echo canceller is used as the second echo canceller, the filter parameter of said frequency domain filter is updated based on an update amount of the filter parameter of the frequency filter calculated by said frequency domain filter controller as well as the update amount of the filter parameter of said time domain filter.

14. The device according to any one of claims 10, 11, 12 and 13, wherein said time domain echo canceller further comprises:
an adder for subtracting the time domain signal output from said time domain filter from a signal received by said time domain echo canceller, so as to output a time domain echo-cancelled signal processed by said time domain echo canceller; and
a time domain filter controller connected with said time domain filter, for calculating an update amount for the filter parameter of said time domain filter based on said receiver signal and the time domain echo-cancelled signal and outputting said update amount to said time domain filter.

15. The device according to claim 14, wherein, in a case that said time domain echo canceller is used as the first echo canceller,
said time domain filter controller is further connected with said frequency domain filter and outputs said update amount to said frequency domain filter; and
the filter parameter of the frequency domain filter is updated based on the update amount of the filter parameter of the time domain filter.

16. The device according to claim 14, wherein, in a case that said time domain echo canceller is used as the second echo canceller, the filter parameter of the time domain filter is updated based on an update amount of the filter parameter of the time domain filter calculated by the time domain filter controller as well as an update amount of the filter parameter of the frequency domain filter.

* * * * *